US006635930B1

United States Patent
Hauptmann et al.

(10) Patent No.: US 6,635,930 B1
(45) Date of Patent: Oct. 21, 2003

(54) PROTECTIVE CIRCUIT

(75) Inventors: Joerg Hauptmann, Wernberg (AT); Alexander Kahl, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/806,070
(22) PCT Filed: Sep. 1, 1999
(86) PCT No.: PCT/DE99/02731
§ 371 (c)(1),
(2), (4) Date: Apr. 30, 2001
(87) PCT Pub. No.: WO00/19573
PCT Pub. Date: Apr. 6, 2000

(30) Foreign Application Priority Data

Sep. 25, 1998 (DE) .......................... 198 44 121

(51) Int. Cl.[7] ............................. H01L 23/62
(52) U.S. Cl. .............. 257/355; 257/356; 257/360; 257/361; 257/362; 257/363; 361/56; 361/58; 361/91.1; 361/111
(58) Field of Search ................. 257/355, 356, 257/360, 361, 362, 363; 361/56, 58, 91.1, 111

(56) References Cited

U.S. PATENT DOCUMENTS

| 5,072,273 | A | * | 12/1991 | Avery | 257/109 |
|---|---|---|---|---|---|
| 5,400,202 | A | | 3/1995 | Metz et al. | 361/56 |
| 5,538,907 | A | | 7/1996 | Aronowitz et al. | 437/34 |
| 5,565,698 | A | * | 10/1996 | Obermeier | 257/355 |
| 5,568,345 | A | | 10/1996 | Mudd et al. | 361/56 |
| 5,640,299 | A | * | 6/1997 | Leach | 361/111 |
| 5,763,919 | A | * | 6/1998 | Lin | 257/360 |
| 5,781,388 | A | | 7/1998 | Quigley | 361/56 |
| 5,825,600 | A | * | 10/1998 | Watt | 257/356 |

FOREIGN PATENT DOCUMENTS

| DE | 33 40 140 | 5/1985 | ............ H02H/9/04 |
|---|---|---|---|
| DE | 42 07 349 | 9/1993 | ............ H01L/23/62 |
| EP | 404220 B1 | 6/1994 | |
| EP | 0651490 B1 | 6/1998 | |
| FR | 2 725 848 | 4/1996 | ............ H02H/9/04 |

* cited by examiner

Primary Examiner—Vu A. Le
Assistant Examiner—Douglas Menz
(74) Attorney, Agent, or Firm—Fish & Richardson P.C.

(57) ABSTRACT

A protective circuit for limiting a voltage at a pad of an integrated circuit includes a threshold selector connected between the pad and ground. The input voltage to the threshold selector is the pad voltage. The threshold detector includes a first transistor where load path is connected to the pad. The central terminal of the first transistor is maintained at a threshold voltage derived from the pad voltage. A second transistor has its control terminal connected to a second terminal of the load path of the first transistor. The load path of this second transistor is connected between the pad and ground.

11 Claims, 1 Drawing Sheet

PROTECTIVE CIRCUIT

BACKGROUND

Figure 1:
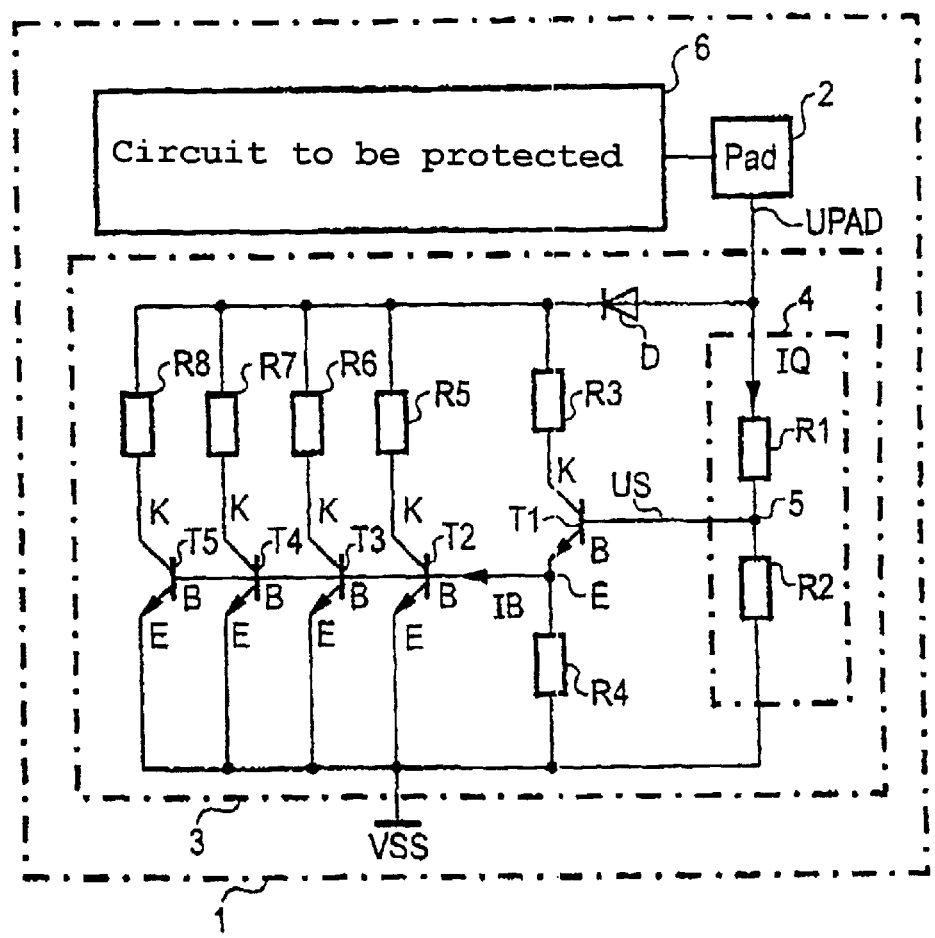

In order to protect integrated circuits against voltages which can damage or destroy the integrated circuit, protective circuits are connected to the terminals (referred to as pads hereinafter) of the integrated circuit. In particular voltages (referred to as ESD voltages hereinafter) at the pads which are caused by electrostatic discharges (ESD= electrostatic discharge) can destroy sensitive structures on the integrated circuits.

A simple protective circuit often used for limiting high voltages at the pads comprises a resistor for input current limiting and two diodes, which are reverse-biased between the pad and a supply voltage and, respectively, a reference-earth potential of the integrated circuit. If a voltage at a pad exceeds the supply voltage, the diode reverse-biased between the pad and the supply voltage begins to conduct and the voltage at the pad is limited to the supply voltage. As a result, the control range of a voltage at a pad is limited to a range between the supply voltage and the reference-earth potential. The second diode begins to conduct if a voltage at the pad falls below the reference-earth potential.

It is often the case, however, that, by way of example, analogue circuit components on the integrated circuit require higher voltages than the supply voltage. In this case, however, the simple protective circuit is a hindrance since voltages at the pads which are larger than the supply voltage of the integrated circuit are limited to the supply voltage by the protective circuit.

U.S. Pat. No. 5,400,202, discloses a protective circuit having a thyristor (SCR=Silicon Controlled Rectifier), the thyristor triggering above a specific voltage at the pad and producing a low-impedance connection between the pad and a reference-earth potential of the integrated circuit, as a result of which ESD voltages at the pad are effectively limited. Thyristors can advantageously conduct high currents and can be turned on rapidly. In U.S. Pat. No. 5,781, 388, a voltage divider is provided in a protective circuit, which voltage divider comprises a capacitance and a resistor and, in the event of voltage changes at the pad, generates a threshold voltage which is used for triggering a thyristor. These protective circuits have the disadvantage of the high triggering voltages required for turning on the thyristor.

The technical problem on which the invention is based consists, therefore, in specifying a protective circuit which avoids the disadvantages mentioned in the introduction.

SUMMARY

The invention relates to a protective circuit connected to a pad of an integrated circuit. The protective circuit has a threshold detector device, which derives a threshold voltage from a voltage at the pad. The threshold voltage controls a first transistor, whose load path is connected to the pad at a first terminal and whose load path is connected to the control terminal of a second transistor at a second terminal. The load path of the second transistor is connected in parallel between the pad and a reference-earth potential and connects the pad to the reference-earth potential. It is advantageous that only a low threshold voltage is required for turning on the protective structure, the threshold voltage corresponding to just twice the turn-on voltage of a transistor.

In a particularly preferred embodiment, a multiplicity of transistors are provided instead of the second transistor, the control terminals of the multiplicity of transistors being connected to the second terminal of the load path of the first transistor and the load paths of the multiplicity of transistors being connected in parallel between the path and the reference-earth potential.

A particularly preferred embodiment relates to the threshold detector device, the latter having a voltage divider connected between the pad and the reference-earth potential. The threshold voltage can be tapped off at a node of the voltage divider. The voltage divider is advantageously constructed from high-value resistors which can be realized in a simple manner in integrated circuits in order that a current through the voltage divider is kept low.

In a particularly preferred embodiment, the transistors are npn bipolar transistors.

In a further preferred embodiment, a respective resistor is connected between the pad and the load paths of the transistors, the resistors serving for current limiting purposes.

In one embodiment, a diode is connected between the resistors and the pad. The diode turns off if a voltage at the pad falls below the voltage at the n terminal of the diode.

In a further embodiment, a resistor is connected between the second terminal of the load path of the first transistor and the reference-earth potential, which resistor serves for setting the operating point of the first transistor.

Further advantages, features and possible applications of the invention emerge from the following description of exemplary embodiments in conjunction with the drawing, in which FIG. 1 shows an exemplary embodiment of a protective circuit according to the invention.

DETAILED DESCRIPTION

An integrated circuit 1 has a pad 2, which is connected to a protective circuit 3. The pad 2 is connected to further circuit components 6, which are to be protected against excessively high voltages at the pad, such as ESD voltages for example.

The protective circuit 3 has a threshold detector device 4 comprising a voltage divider R1 and R2. The device 4 is connected between the pad 2 and a reference-earth potential VSS of 15 the integrated circuit. The voltage divider divides a voltage UPAD present at the pad 2 into a threshold voltage US present at a node 5 of the voltage divider:

$$US = UPAD \cdot \frac{R2}{R1 + R2}$$

The threshold voltage US is thus adjustable by way of the voltage divider ratio and, for the voltage to which limiting is intended to be effected, must be at least twice the base-emitter voltage of an npn bipolar transistor in order to switch transistors of the protective circuit. By way of example, if the protective structure is intended to be switched on starting from a voltage of 8V, the following holds true for the voltage divider ratio given a base-emitter voltage UBE of approximately 0.7V:

$$US \approx 2 \cdot UBE \approx 1.4 \text{ V} = \frac{R2}{R1 + R2}$$

Typical values for the resistors of the voltage divider are: R1=300 kΩ and R2=75 kΩ

This results in a voltage divider ratio of:

$$\frac{R2}{R1+R2} = \frac{75 \text{ k}\Omega}{375 \text{ k}\Omega} = 0.2$$

In the case of a voltage of approximately 7V at the pad, the required threshold voltage given the above resistances is 1.4V.

The threshold voltage US drives a first bipolar npn transistor T1. The emitter of the transistor T1 is connected to the reference-earth potential VSS via a resistor R4. The collector of the transistor T1 is connected to the n terminal of a diode D via a resistor R3. The p terminal of the diode D is in turn connected to the pad 2. The two resistors R3 and R4 set the operating point of the transistor T1.

Further bipolar npn transistors T2, T3, T4 and T5 are driven in parallel by the first transistor T1. To that end, the base of each transistor T2, T3, T4 and T5 is connected in parallel to the collector of the transistor T1. The emitters of the transistors T2, T3, T4 and T5 are jointly connected to the reference-earth potential VSS. The collector of each transistor T2, T3, T4 and T5 is in each case connected via a resistor R5, R6, R7 and R8, respectively, to the n terminal of the diode D. The load paths of these transistors T2, T3, T4 and T5, together with the resistors R5, R6, R7 and R8 respectively connected upstream, connect the pad 2 to the reference-earth potential VSS, the resistor being adjustable via the transistors T2, T3, T4 and T5.

The protective circuit operates as follows:

If a voltage UPAD at the pad 2 exceeds a predetermined value, so that the threshold voltage US corresponds to about twice the base-emitter voltage of a bipolar npn transistor, the first transistor T1 switches and begins to conduct. A current IB flows via the load path of this transistor to the base of the transistors T2, T3, T4 and T5. These transistors are controlled, so that the resistance of their load paths decreases and the pad 2 is connected with low impedance to the reference-earth potential VSS and a current flows from the pad 2 via the transistors T2, T3, T4 and T5 connected in parallel. The higher the voltage UPAD at the pad then becomes, the more the threshold voltage US also rises and turns the first transistor on until the latter attains saturation. The transistors T2, T3, T4 and T5 connected in parallel are turned on further by the first transistor T1, via its emitter current, so that the connection between pad 2 and reference-earth potential VSS via the transistors T2, T3, T4 and T5 connected in parallel requires a lower and lower impedance. As a result, the voltage UPAD at the pad 2 also decreases.

If the voltage UPAD at the pad 2 falls below a predetermined value, the threshold voltage US also falls. With a falling threshold voltage US, the load paths of the first transistor T1 and of the transistors T2, T3, T4 and T5 connected in parallel acquire higher impedance. The potential at the n terminal of the diode D rises and the diode D turns off as soon as the potential difference between the n terminal and the p terminal falls below the forward voltage of the diode D. As a result, the protective structure is switched off and takes up only a current via the voltage divider R1 and R2 from the pad 2.

The current carrying capacity of the protective circuit is adjustable by way of the number of transistors connected in parallel. However, care must be taken to ensure that the current IB which flows via the emitter E from the first transistor T1 to the base of the transistors T2, T3, T4, T5 connected in parallel is adequate to control the transistors T2, T3, T4, T5 connected in parallel. If appropriate, the first transistor T1 must be given larger dimensions in order to be able to supply more current for controlling the transistors T2, T3, T4, T5 connected in parallel. The current carrying capacity of the protective structure can also be adjusted by means of a higher current carrying capacity of the individual transistors T2, T3, T4, T5 connected in parallel, where the base current required for controlling the transistors once again has to be taken into consideration.

The resistors R5, R6, R7, R8 connected upstream of the transistors T2, T3, T4 and T5 connected in parallel are to be dimensioned such that they have low resistances, and serve merely as current-limiting series resistors for protecting the transistors against excessively high currents.

A current IQ flows continuously via the voltage divider, so that the resistance (R1+R2) of the voltage divider should be as large as possible in order to minimize the current consumption of the protective circuit.

Having described the invention, and a preferred embodiment thereof, what is claim as new and secured by Letters Patent is:

1. A protective circuit for limiting a voltage at a pad of an integrated circuit, the protective circuit being connected between the pad and a reference-earth potential of the integrated circuit, the protective circuit comprising:
    a threshold detector device connected to the pad and deriving a threshold voltage from the voltage at the pad, the threshold detector device having:
        a first transistor, whose load path is connected to the pad at a first terminal and to whose control terminal the threshold voltage is fed,
        a resistor connected between the second terminal of the load path of the first transistor and the reference-earth potential,
        a second transistor, whose control terminal is connected to a second terminal of the load path of the first transistor and whose load path is connected between the pad and the reference-earth potential,
        a high-resistance voltage divider connected between the pad and the reference-earth potential, the voltage divider having a node for enabling tapping of the threshold voltage, and
        a diode connected between the pad and the load paths of the first transistor and of the second transistor such that the diode is reverse-biased when the voltage at the pad falls below a predetermined value, thereby switching off the protective circuit.

2. The protective circuit as claimed in claim 1, wherein the second transistor comprises a multiplicity of parallel transistors, the control terminals of the multiplicity of parallel transistors being connected to a second terminal of the load path of the first transistor and the load paths of the multiplicity of parallel transistors being connected in parallel between the pad and the reference-earth potential.

3. The protective circuit as claimed in claim 1, wherein the first transistor is an npn bipolar transistor.

4. The protective circuit as recited in claim 1, further comprising a first shunt resistor connected between the pad and the load path of the first transistor.

5. The protective circuit as claimed in claim 4, further comprising a diode connected between the first shunt resistor and the pad, the diode having a p terminal connected to the pad and an n terminal connected to the first shunt resistor.

6. The protective circuit as claimed in claim 1, further comprising a ground resistor connected between the second terminal of the load path of the first transistor and the reference-earth potential.

7. The protective circuit of claim 1, wherein the second transistor is an npn transistor.

8. The protective circuit of claim 2, wherein each of said parallel transistors is an npn transistor.

9. The protective circuit of claim 1, further comprising a second shunt resistor connected between the pad and the load path of the second transistor.

10. The protective circuit of claim 2, further comprising a respective resistor connected between the diode and the load paths of the first transistor, the second transistor, and respectively, of the multiplicity of parallel transistors.

11. The protective circuit of claim 10, wherein the diode comprises a p terminal connected to the pad and an n terminal connected to the respective resistor.

* * * * *